(12) United States Patent
Marandos et al.

(10) Patent No.: US 8,543,357 B1
(45) Date of Patent: Sep. 24, 2013

(54) RF POWER DENSITY AND FIELD CHARACTERIZATION TECHNIQUE

(75) Inventors: Peter Marandos, Bloomington, IN (US); Grady Patterson, Greer, SC (US); Kenneth Leeson, Edgewood, NM (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 359 days.

(21) Appl. No.: 12/983,230

(22) Filed: Dec. 31, 2010

Related U.S. Application Data

(60) Provisional application No. 61/362,823, filed on Jul. 30, 2010.

(51) Int. Cl.
*H03F 1/26* (2006.01)
*G01J 5/02* (2006.01)

(52) U.S. Cl.
USPC .................................. 702/189; 250/341.8

(58) Field of Classification Search
CPC ............................................. H04B 10/00
USPC ..................... 702/189; 250/341.8
See application file for complete search history.

(56) References Cited

U.S. PATENT DOCUMENTS

| 6,616,304 B2* | 9/2003 | Li ................................. 362/302 |
| 2012/0014491 A1* | 1/2012 | Deeth ........................... 376/103 |
| 2013/0022077 A1* | 1/2013 | Harmon et al. ............... 374/178 |

OTHER PUBLICATIONS

Oda, Y., Kajiwara, K., Takahashi, K., Kasugai, A., Shapiro, M., Temkin, R., and Sakamoto, K.. Measurement of RF Transmission Mode in ITER Relevant EC H&CD Transmission Line, 2010, Journal of Infrared Millimeter and Terahertz Waves, 31:949-957.*

Gerardi,C and Buongiorno, J. Pressure-tube and calandria-tube deformation following a single-channel blockage event in ACR-700, 2007, Nuclear Engineering and Design. 237:943-954.*

* cited by examiner

*Primary Examiner* — Jonathan C Teixeira Moffat
*Assistant Examiner* — Joseph J Yamamoto
(74) *Attorney, Agent, or Firm* — Christopher A. Monsey

(57) ABSTRACT

An apparatus and method for characterization of a directed beam of electromagnetic radiation is provided. An exemplary embodiment of the invention can include an apparatus and measuring technique method which uses a model for blackbody radiation that includes consideration all the degrees of freedom due to translation, vibration, and rotation of molecules or atoms that make up the absorber and a heat transfer term which averages the behavior of all the atoms of the material as a function of temperature. This apparatus and method provides an advantage of increased accuracy, substantial reductions of time required for processing, simplification of measuring processes, and reduction required equipment.

18 Claims, 8 Drawing Sheets

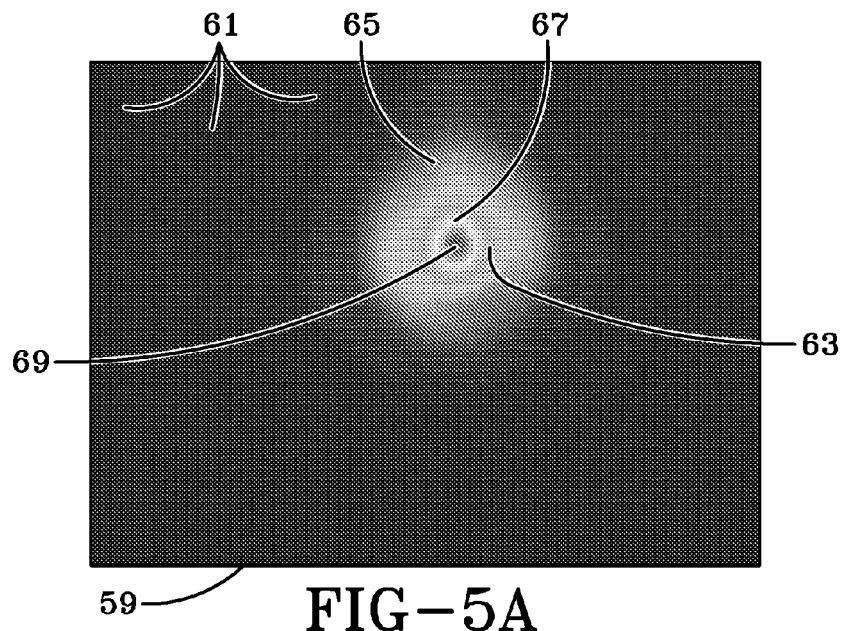
FIG-5A
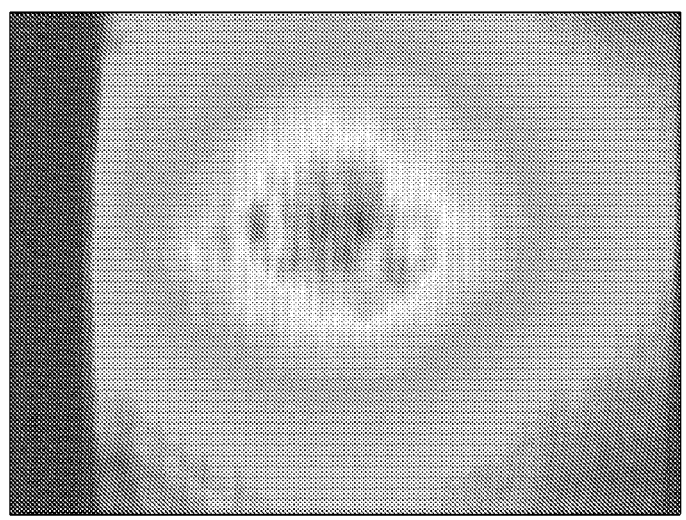
FIG-5B
|  | Monatomic | Linear Molecule | Non-Linear Molecule |
|---|---|---|---|
| Position | 3 | 3 | 3 |
| Rotation | 0 | 2 | 3 |
| Vibration | 0 | $3n-5$ | $3n-6$ |
FIG-6

RF POWER DENSITY AND FIELD CHARACTERIZATION TECHNIQUE

CROSS-REFERENCE TO RELATED APPLICATION

This application claims priority to U.S. provisional patent application Ser. No. 61/362,823, having a filing date of Jul. 30, 2010, the disclosure of which is expressly incorporated by reference herein.

STATEMENT REGARDING FEDERALLY SPONSORED RESEARCH OR DEVELOPMENT

Government Interest. The invention described herein may be manufactured, used and licensed by or for the United States Government and may be manufactured, used, licensed by or for the United States Government without payment of any royalties thereon.

BACKGROUND

The present invention relates to an apparatus, system and method for characterizing and measuring a directed electromagnetic (EM) field characterization, e.g., a radio frequency (RF) beam. Previous approaches to RF beam measurement employed a model of heat transfer from one macroscopic body to another and blackbody radiation of a particle with only one degree of freedom.

Other techniques can use a horn antenna, attenuators, and power meter to collect data at different points along a plane perpendicular to the beam. This technique is much more time consuming the apparatus is more complicated and in many cases must be automated with translational stages in order to make an accurate measurement.

Additional features and advantages of the present invention will become apparent to those skilled in the art upon consideration of the following detailed description of the illustrative embodiment exemplifying the best mode of carrying out the invention as presently perceived.

SUMMARY OF THE INVENTION

According to an illustrative embodiment of the present disclosure, an embodiment of the invention can be used to characterize a directed beam of EM radiation. In particular, an embodiment of the invention can include an apparatus and measuring technique method which uses a model for blackbody radiation which includes consideration of all the degrees of freedom due to translation, vibration, and rotation of molecules or atoms that make up the absorber and a heat transfer term which averages the behavior of all the atoms of the material as a function of temperature. This apparatus and method provides an advantage of increased accuracy, substantial reductions of time required for processing, simplification of measuring processes, and reduction required equipment.

BRIEF DESCRIPTION OF THE DRAWINGS

The detailed description of the drawings particularly refers to the accompanying figures in which:

FIG. 5A shows an exemplary output associated with one type of EM source produced and displayed in accordance with one embodiment of the invention.

FIG. 5B shows an exemplary output associated with another type of EM source produced and displayed in accordance with one embodiment of the invention.

FIG. 6 shows an exemplary degrees of freedom table having data which is used in association with blackbody calculations for use in accordance with one embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
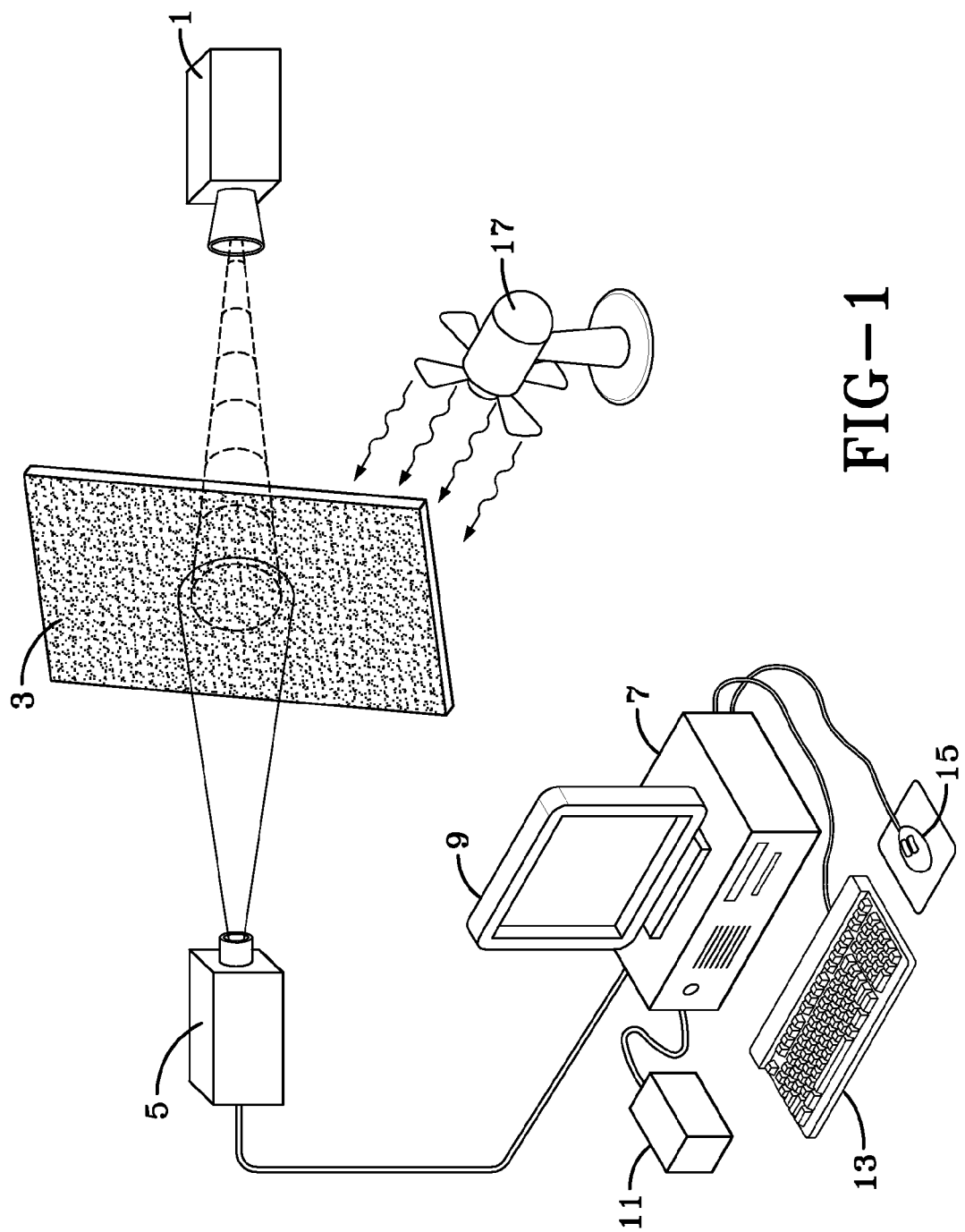
FIG. 1 shows a description of an exemplary system in accordance with one embodiment of the invention.

Referring to FIG. 1, an exemplary embodiment of an EM field measuring system is shown which includes an EM source 1 (e.g., an infrared source), an EM absorption material 3 (e.g., a sheet of carbon loaded Kapton®), and a temperature sensor array 5 (e.g., an infrared camera) to measure the temperature of the EM absorption material 3. The temperature sensor array 5 is coupled with a processing system 7 which has software (further discussed below) for processing data received and outputting data representations characterizing an EM field which was directed on the EM absorption material 3. These data representations can be displayed on a display system 9 or transmitted to a network via a network hub 11 for further processing, output, or other action. Software on the processing system 7 generally can be operable by a user via a graphical interface which permits interaction between the user and system via an interface system such as a keyboard 13 and a mouse 15 however another interface can be used such as a touch screen (not pictured). Optionally, a gas or air circulation unit 17 can be used to keep the EM absorption material 3 near or at room temperature for the purposes of heat transfer from the absorber to ambient air or atmosphere surrounding the EM absorption material 3.

A variety of types of suitable coolant or temperature control system can be used to provide a temperature control action/effect for the invention particularly where the system is in an environment where environmental factors or heat transfer variables can impact the overall results obtained by the temperature sensor array 5. In other words, temperature sensor array data can be adversely impacted where environmental factors alter the heat transfer characteristics of an EM absorption material 3 e.g., being outside with variable winds, sun, etc which create changes in heat transfer from factors besides a particular EM source. Other types of heat transfer control components/systems can also be used, including multiple cooling mechanisms, heat sinks or other heat transfer or control systems. Also, increased accuracy can be obtained by using such a temperature control mechanism for an EM absorption material in general, including indoor environments, as "hot pockets" or uneven heat transfer areas can form around the surface of a given EM absorption material preventing heat transfer to occur as convection forces alone frequently are insufficient to ensure uniform heat transfer across the applicable surface of a given EM absorption material.

Referring to FIG. 1, EM source 1 is energized and is positioned so an EM field emitted by EM source 1 is incident onto the EM absorption material 3. A temperature sensor array, e.g., an infrared (IR) camera frame capture, which shows the temperature of the absorption material, e.g., Kapton®, before the EM source 1 is turned on, is used along with a frame of when the absorption material 3 has reached thermal equilibrium and the time it took to reach thermal equilibrium. It should be noted that another embodiment can use another temperature sensor array for the EM Absorber besides an IR camera such as an array of thermocouples which could produce simultaneous temperature readings of a region of interest of the EM absorber over a period of time. A variety of different EM absorbers can be used with the invention as well.

Figure 2:
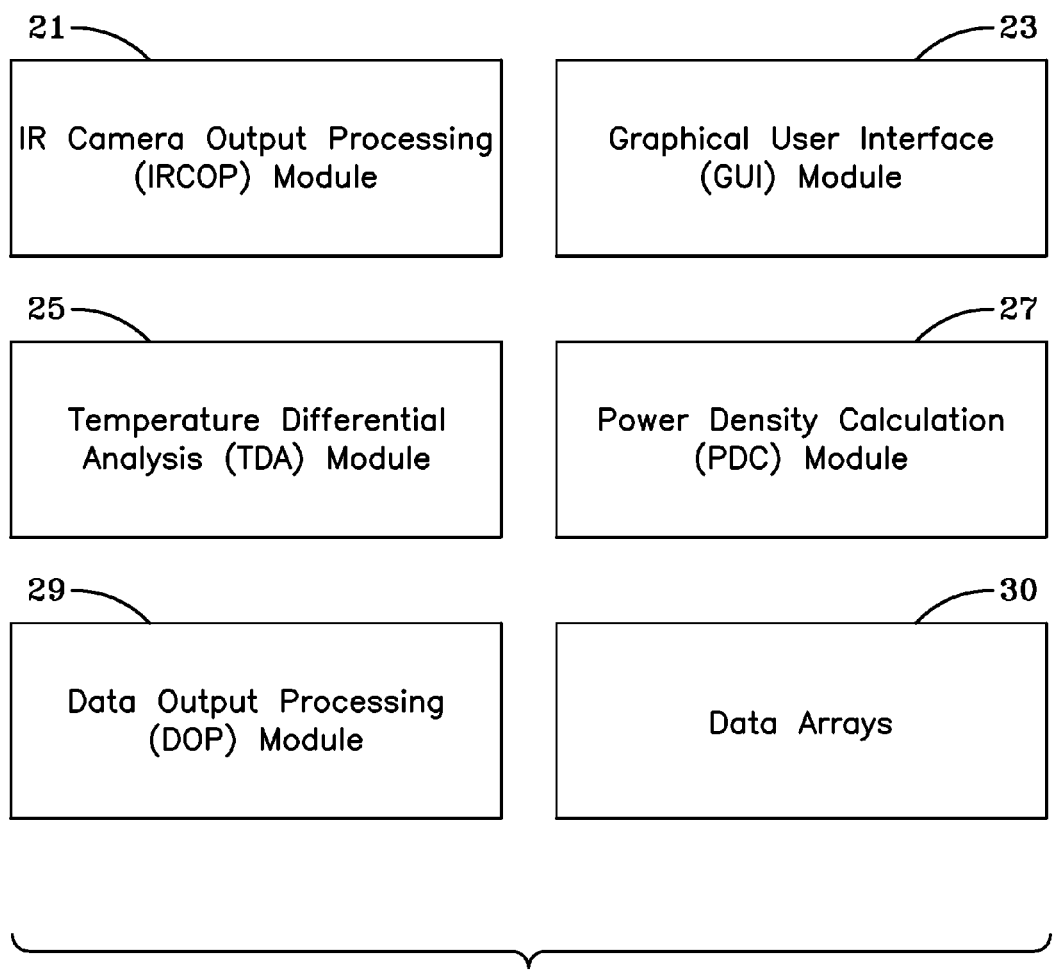
FIG. 2 shows an exemplary functional description of software modules describing one way of organizing processing sequences or software in accordance with one embodiment of the invention.

Referring to FIG. 2, a functional diagram of processing software associated with an exemplary embodiment of the invention is shown. An IR Camera Output Processing (IR-COP) Module 21 creates a Temperature Data per Pixel (TDPP) array. IRCOP produces the TDPP array based on a series of IR camera image frame captures of an EM Absorber before, during, and, optionally, after exposure to an activated EM source (e.g., directed energy beam or an EM field produced by an antenna or wave guide). In particular, the TDPP array stores a series of IR image frames or snapshots of the EM absorber taken by the temperature sensor array 5 (e.g., IR camera) over time. Each IR image frame comprises temperature data associated with pixels in the IR camera 5 used to capture each IR image frame. The TDPP array includes a file name, a series of IR image frame captures including a temperature data value for each pixel, and time of capture for the temperature data value for each frame/pixel. This exemplary array can be stored as a compressed audio video interleave (AVI) file.

Figure 3:
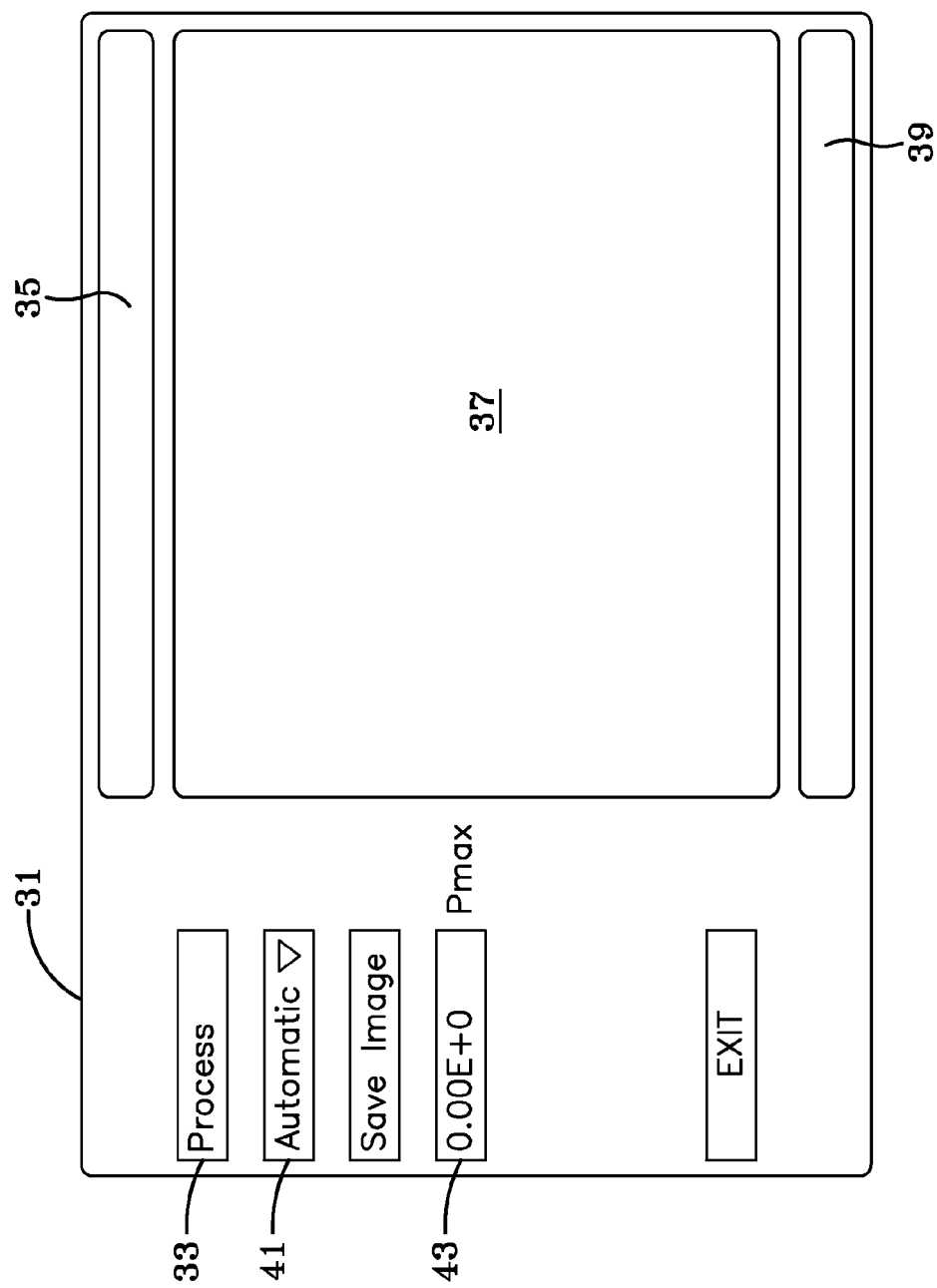
FIG. 3 shows an exemplary graphical user interface for controlling processing, inputs, and producing outputs in accordance with one embodiment of the invention.

A graphical user interface (GUI) Module 23 is provided for controlling operations in the processing software and providing outputs. The GUI Module 23 creates GUIs such as are shown in FIG. 3.

A Temperature Differential Analysis (TDA) Module 25 includes a section for determining an initial state temperature (e.g., a "cold" frame with a lowest overall temperature value) associated with one of the series of IR image capture frames stored in the TDPP, a final state temperature (e.g., a "hot" frame associated with a highest overall temperature value) associated with one of the series of IR image capture frames acquired over a period of time, and elapsed time between the initial and final state temperatures based on the TDPP array data. For example, the TDA Module 25 can select a "cold" IR image capture frame and a "hot" IR image capture frame based on comparing all frames and finding the frames which have pixels which have lowest overall temperature and the highest overall temperature. Processing in the TDA Module 25 can include data input (e.g., TDPP array), pre-processing (e.g., determination of elapsed time between initial and final states (e.g., "cold" and "hot" IR image capture frames), selection of an initial temperature state IR image capture frame (e.g. "cold") and a final IR image capture frame (e.g., "hot")), calculation of differential temperature values per pixel, and temperature differential (TD) array creation. In this example, the initial temperature state is a state prior to EM source activation and final temperature state is a state where an EM Absorber 3 reaches a predetermined temperature such as an approximate peak temperature value. In an embodiment where a pulsed EM (e.g. RF) source is directed onto an EM absorber, the final temperature state can be at any point after the EM source is turned on where a maximum temperature value is reached or another parameter (e.g., time) is met. An exemplary TD array includes an IR image capture frame determined to have the desired initial temperature state (e.g., cold), an IR image capture frame determined to have the desired final temperature state (e.g., "hot"), time values associated with both selected IR image capture frames, and elapsed time associated with each selected IR image capture frame and/or pixels in an array of temperature sensor array 5 e.g., IR Camera.

An exemplary Power Density Calculation (PDC) Module 27 calculates power density associated with all or selected pixels in the selected IR image capture frames (i.e., "cold" and "hot" frames) from a temperature sensor array 5 (e.g., IR Camera) and stores it in a Power Density per Pixel (PDPP) array. The PDC Module 27 receives inputs including inputs from the TDA Module 25 including the TD array 47. Power density in this example is calculated based on at least two temperature sensor array captures selected using temperature data values (e.g., initial IR image capture frame (e.g., "cold) and final IR image capture frame (e.g., "hot")), elapsed time between at least two temperature sensor array captures, reflection and transmission coefficients of an EM absorber, degrees of freedom data associated with atoms in the EM absorber (e.g., see FIG. 6 table), emissivity of the EM absorber, Stefan-Boltzmann's Constant, specific heat capacity of the EM absorber, density of a medium which is used to cool the EM absorber (e.g., air, heat sink, etc), volume of medium used to cool the EM absorber, and area of interface between the medium used to cool the EM absorber and the EM absorber. An alternate embodiment can include an EM absorber which is sufficiently large enough to act as a heat sink for itself and thereby add to the medium used to cool the EM absorber therefore must be factored into the processing by the PDC Module 27. A general form of a power density calculation performed by the PDC Module 27 is provided in FIG. 7A. Power density calculation performed in this exemplary PDC Module 27 can be affected by selection of different EM absorbers and various factors including cooling of the EM absorber.

An example of processing performed in PDC Module 27 for a specific EM absorber can include a thermal imaging and millimeter wave measurement technique using a carbon loaded polymer sheet called Kapton® and treating it as a diatomic gas. An exemplary calculation for a particular EM absorber, a Kapton® EM absorber, and the exemplary testing configuration shown in FIG. 1, and the software described in FIG. 2 is shown in Equation 1.

$$P = \frac{2}{1 - |\Gamma|^2 - |\tau|^2}\left[2\varepsilon_{ir}\sigma_b(T_s^4 - T_0^4) + \frac{C\rho_K}{\Delta t}(T_s - T_0)\right] \quad (1)$$

where, $\tau$=Coefficient of transmission, $\Gamma$=Coefficient of reflection, $\sigma_b$=Stefan-Boltzmann constant (W/cm$^2$-K$^4$), $\varepsilon_{ir}$=emissivity of Kapton®, $T_s$=Temperature of sample (Kelvin), $T_0$=Initial temperature of sample (Kelvin), $\Delta t$=Time to equilibrium (seconds), $\rho_K$=Density of Kapton® (kg/cm$^2$), and C=Specific Heat (J/g-K). Note that the portion of equation 1 which has the coefficient of transmission and coefficient of reflection outside the brackets is an absorption coefficient, in this case for the EM material. A power density formula, such as shown in equation 1, must be adapted to a particular material composition used in the EM absorber. An exemplary Data Output Processing (DOP) Module 29 provides various outputs including a power density image (PDI) array. The PDI array stores data required to produce a digital representation that is displayed in cooperation with the GUI Module 23 and further discussed in connection with FIG. 4.

The Data Array 30 section of this exemplary embodiment stores data associated with processing in an exemplary embodiment of the system. Data arrays in this embodiment include TDPP produced by IRCOP Module 21, TD array produced by the TDA Module 25, a PDPP array produced by the PDC Module 27, and PDI array associated with DOP Module 29. A Configuration Data Array (CDA) can be provided to store data which is used in processing such as the degrees of freedom data. It should be noted that a variety of data structures can be used to perform the function of Data Array 30. For example, data arrays can be local to code modules or global data arrays.

Referring to FIG. 3, a screen view of a main control graphical user interface 31 is shown associated with processing software. A process control 33 is used to commence execution of the processing system 7. After the process control 33 is selected, a file path input dialog window (not shown) is displayed to permit selection of a file path similar to Windows Explorer for use in navigating file structures and selecting a file stored on a computer system running the software. A dialog (or dialogue) box is a special window, used in user interfaces to display information to the user, or to get a response if needed. They are so-called because they form a dialog between the computer and the user—either informing the user of something, or requesting input from the user, or both. It provides controls that allow a user to specify how to carry out an action. A display field 35 is provided to show the file path information selected using the file path input dialog window (not shown). A Mode Selector 41 dialog box permits a user to select an automatic or manual process for identifying an initial IR image capture frame (e.g., "cold" frame) data and final IR image capture frame (e.g., "hot" frame) data associated with a series of IR image captures outputted by a temperature sensor array (e.g., IR camera) and stored in a data array.

Figure 4:
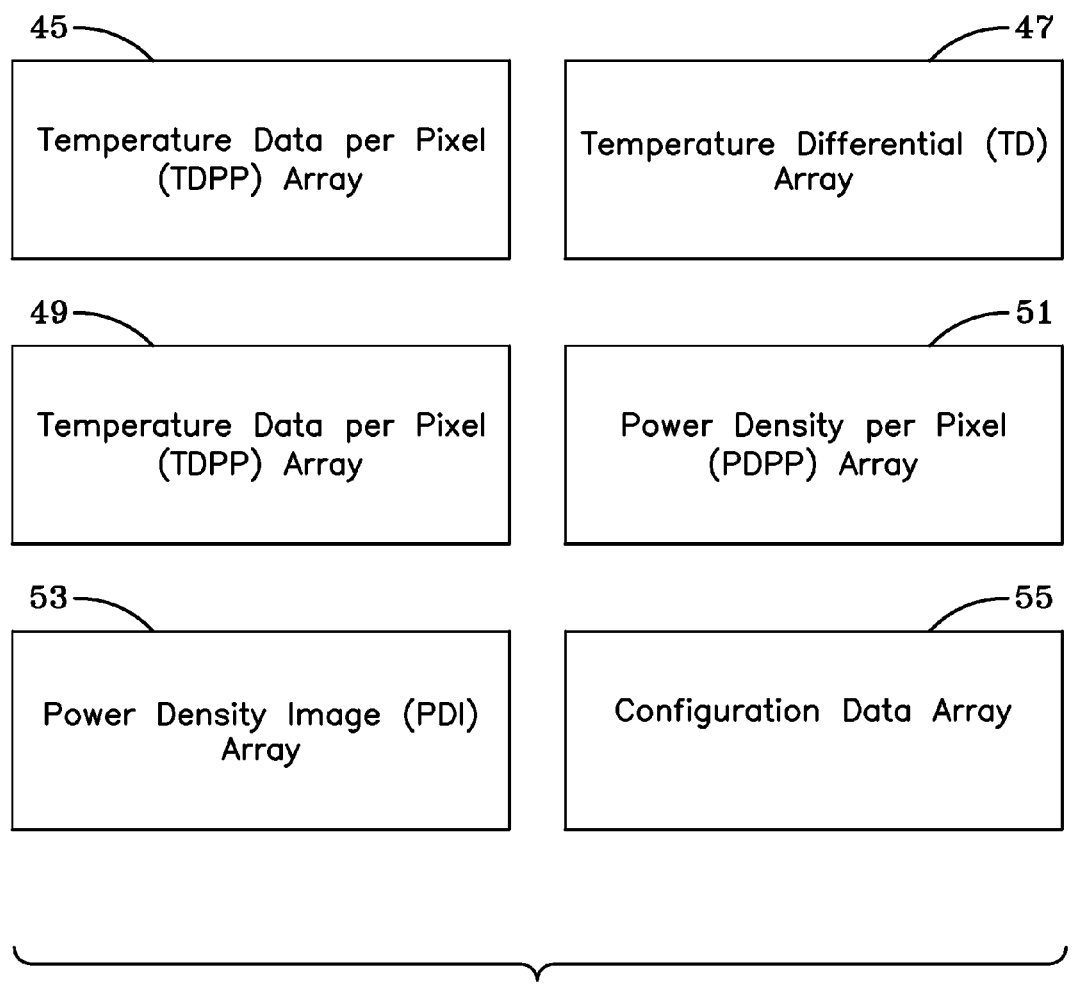
FIG. 4 shows an exemplary description of data arrays used with software used for processing in accordance with one embodiment of the invention.

Referring to FIG. 4, another organization of the data arrays described in association with the Data Arrays Module of FIG. 2 is provided. In this example, the data arrays are shown in separate format from the FIG. 2 representation but with the same functionality and purpose to include the TDPP Array 45, TD Array 47, TDPP Array 49, PDPP Array 51, PDI Array 53, and CDA Array 55.

Referring to FIG. 5A, an exemplary power density image output 59 associated with Gaussian Optical Lens Antenna (GOLA) antenna produced by the GUI Module 23 is shown. This power density image output 59 can be produced based on data including PDI array data generated by DOP Module 29. This power density image output 59 can be displayed in the image viewer window 37 (FIG. 3). The power density image output 59 in this embodiment is a graphical image showing power density per pixel of an IR Camera (e.g., 5) produced using embodiment of the invention.

The power density image output 59 in this embodiment includes a graphical representation of an EM field produced by an EM source under test where the representation is made up of different colors associated with different ranges of power density values. This output shows one way to represent power density per pixel by characterizing an EM source (e.g., an antenna field pattern) plus pattern density in one representation. Each pixel in this output has a power density data associated with that pixel. In this example, different colors are used for a number of ranges of power density such as red for a peak range and blue for the lowest data range. These ranges are predetermined, selected in advance, and associated with a particular color representation in this embodiment. The output processing software associated a desired color with a given power density data value associated with a particular pixel by determining which range the power density data value falls within.

For example, in FIG. 5A a series of differently colored regions is shown which are roughly surrounding a maximum EM field incident on an EM absorber under test. In particular, in this exemplary representation a background (blue) region 61 represents no EM field incident on the EM absorber. A light blue or hazy area 65 within the background region represents the weakest measured range of EM field(s) incident on the EM absorber. A green region 63 which is within the white or hazy region 65 represents the next higher range of power density measured associated with the EM field incident on the EM absorber under test. A yellow region 67 which is within the green region 63 represents the next higher range of power density measured associated with the EM field incident on the EM absorber under test. A red region 69 which is within the yellow region 67 represents the highest power density measured associated with the EM field incident on the EM absorber under test.

This power density image output 59 permits characterization of an EM field produced by an EM source under test. The exemplary power density image output 59 also provides an ability to display a specific power density value 39 (FIG. 3) for a specific pixel. One embodiment of the invention can include provision of a pointing device or an electronically manipulated cursor which can be moved over each pixel in the power density image output 59. A power density per pixel data value 39 (FIG. 3) will appear when the pointing device or cursor points to each pixel. One embodiment of the invention can include a provision for displaying a power density maximum data value (Pmax 43, FIG. 3) that will appear showing a highest power density data value 43 for a specific pixel contained in the exemplary power density image output 59.

Outputs (e.g., power density image output 59) from the DOP 29 and GUI Module 23 can be used to determine field strength of an EM source in a specific area of space, near field analysis, or far field analysis. Other modeling and analysis outputs can be produced with this invention based on representation of EM fields associated with an EM source generating a field into free space. One example is producing a representation and analysis of 3 db spot sizes of a directed energy beam or an antenna.

FIG. 5B shows a different representation of an EM field produced by a W-band pyramidal standard gain antenna coupled to an EM source under test using an embodiment of the invention. In this example, the same type of power density color representation scheme is used as is shown in FIG. 5A, however the distribution of the power density/colors are different due to the differences in EM field(s) measured using an embodiment of the invention.

Any number of or variety of antennas can be used with the invention. Other EM sources/antennas/coupling devices which can be used with the invention include waveguides, lasers, or any other EM spectrum source which produces a change, e.g., a temperature change, in the EM absorber.

FIG. 6 shows an exemplary degrees of freedom table having data which is used in association with blackbody calculations. In particular, this table can be used for computing the number of degrees of freedom of a system of atoms or molecules which comprise an EM absorber where n is the number of atoms per molecule, e.g., a sheet of carbon loaded Kapton®. The table includes position, rotation, and vibration for monatomic atoms as well as linear and non-linear molecules. These values are predetermined and used to obtain one factor of the co-efficient of a blackbody radiation term used in calculations associated with an embodiment of the invention. In this example, the FIG. 5 table is used in processing which is performed by the PDC Module 27. The degrees of freedom table can include degrees of information data associated with different types of materials used as EM absorbers. For example, in the exemplary table in FIG. 6 different ways to calculate or represent degrees of freedom for different materials is shown. For Kapton®, there is a carbon powder pressed into a polymer sheet. Because the carbon is in powder form, it has three degrees of freedom of position and 3n-5 degrees of freedom in vibration plus 3 in position which gives 3n-2. Based on this position and vibration information, total degrees of freedom for Kapton® is then 4 (i.e., 3n-2 where n=2 given carbon is a diatomic atom with 2 atoms per molecule) for the powder form of carbon. Different table values and potentially different table compositions or data elements may be required for different embodiments of the invention including different EM absorbers.

Figure 7A:
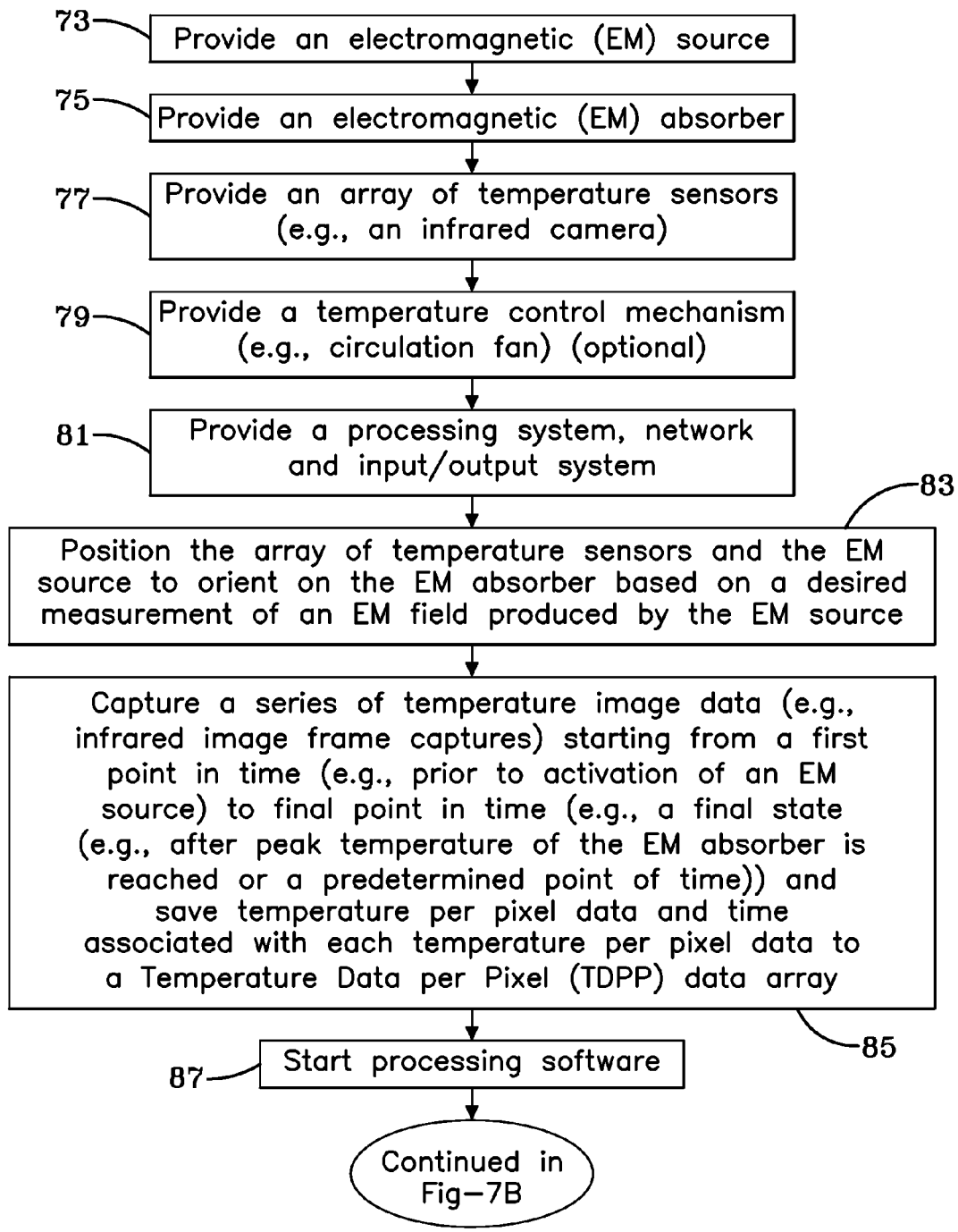
FIG. 7A shows an exemplary method used in producing outputs in accordance with one embodiment of the invention.
Figure 7B:
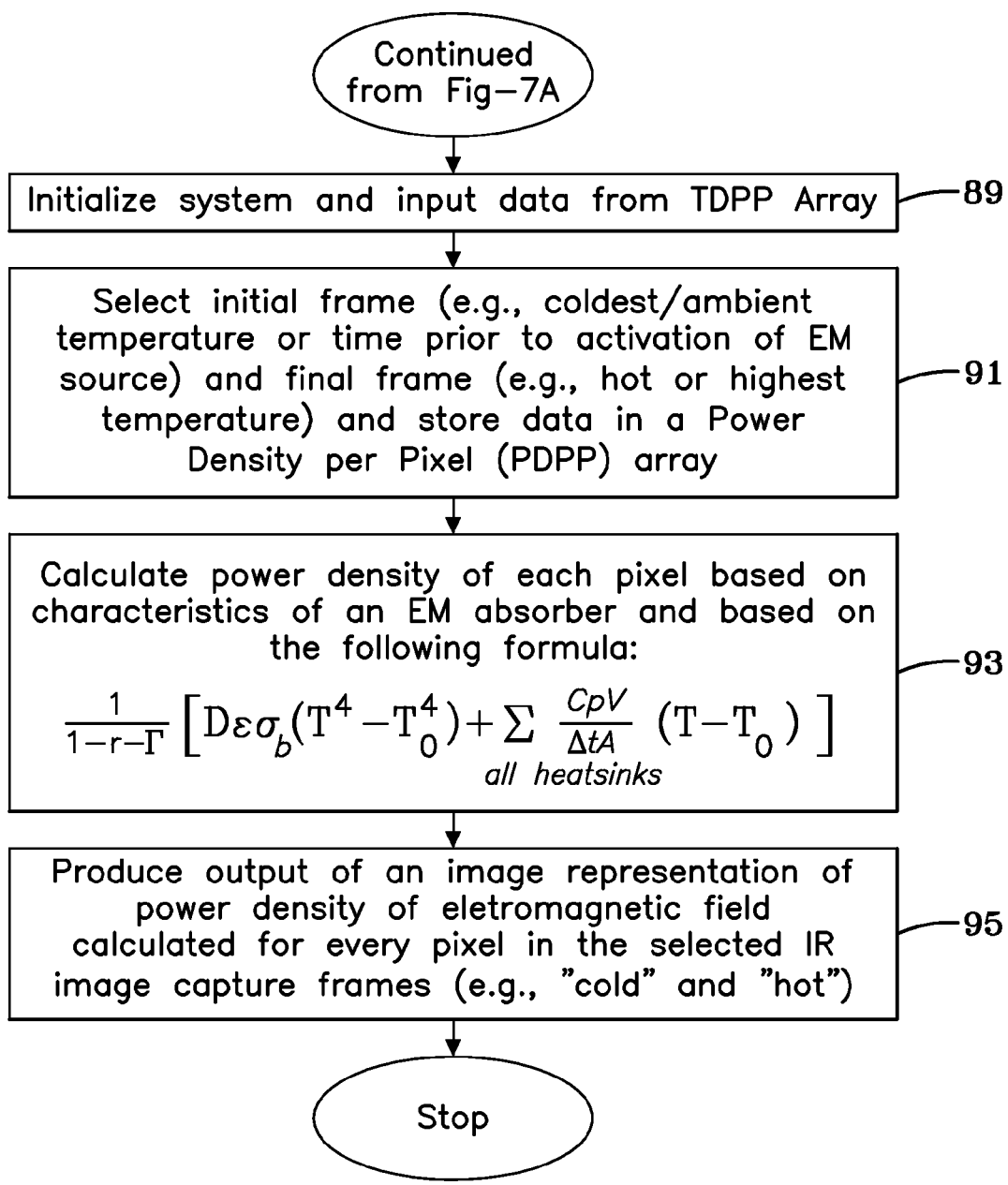
FIG. 7B is a continuation of the FIG. 7A description of an exemplary process in accordance with one embodiment of the invention.

FIGS. 7A and 7B shows steps used in producing outputs in accordance with one embodiment of the invention. In step 1 (73), provide an EM source (e.g., an RF source). In step 2 (75), provide an EM absorber. In step 3 (77), provide an array of temperature sensors (e.g., an infrared camera). In step 4 (79), provide a temperature control mechanism (e.g., circulation fan) (optional). In step 5 (81), provide a processing system, network and input/output system. In step 6 (83), position the array of temperature sensors and the EM source to orient on the EM absorber based on a desired measurement of an EM field produced by the EM source. In step 7 (85), capture a series of temperature image data frames (e.g., infrared image frame captures) and saving each temperature image data frames that includes temperature per pixel data and time associated with each temperature image data frame to a Temperature Data per Pixel (TDPP) data array. In step 8 (87), start processing software. In step 9 (89), initialize system and input data from TDPP Array. In step 10 (91), select an initial temperature image data frame (e.g., coldest/ambient temperature or time prior to activation of EM source) and a final temperature image data frame (e.g., hot or highest temperature) from the series of temperature image data frames and store in a power density per pixel array (PDPP) array. In step 11 (93), calculate power density associated with each pixel in the initial and final frames selected at step 10 (91) based on determining a plurality of characteristics of an EM absorber including absorption coefficient of the EM absorber, degrees of freedom for atoms or molecules associated with the EM absorber, emissivity, Stefan-Boltzmann's Constant, number of sides being cooled, specific heat capacity of coolant, density of coolant, volume of coolant, area that the coolant will be in contact with EM absorber, change in time between initial and final frame capture, and an initial and final temperature data of the EM absorber. Equation 2 provides an exemplary power density calculation formula that can be used in step 11 (93).

$$\frac{1}{1-\tau-\Gamma}\left[D\varepsilon\sigma_b(T^4-T_0^4) + \sum_{All\ Heat\ Sinks}\frac{C\rho V}{\Delta tA}(T-T_0)\right] \quad (2)$$

Where $\Gamma$ is the coefficient of absorption of the EM absorber, $\tau$ is the coefficient of transmission of the EM absorber, T is the final temperature of the EM absorber, $T_0$ is the initial temperature of the EM absorber, $\varepsilon$ is the emissivity of the EM absorber, $\sigma_b$ is the Stefan-Boltzmann constant, C is the specific heat of the heat sink (coolant), V is the volume of the heat sink (coolant), $\rho$ is the density of the heat sink (coolant), A is the contact area between the absorber and the heat sink (coolant), $\Delta t$ is the time between the initial frame to the final frame, and D is the degrees of freedom of the atoms or molecules that comprise the EM absorber. In step 12 (95), produce output of an image representation of power density of EM field calculated for every pixel in the selected IR image capture frames (e.g., "cold" and "hot").

An alternate embodiment of a power density measurement method in accordance with the invention for pulsed power density measurement could include steps 1 (73) through step 10 (91). The alternate embodiment processing for alternate embodiment step 11 would then deviate using an alternate power density calculation using the formula described in equation 3.

$$\sum_{l=0}^{L}\frac{1}{1-\tau-\Gamma}\left[4D\varepsilon\sigma_b T_l^3(T_l-T_{l-1}) + \sum_{All\ Heat\ Sinks}\frac{C\rho V}{(t_l-t_{l-1})A}(T_l-T_{l-1})\right] \quad (3)$$

Regarding equation 3, the first summation is a sum over data points measuring the temperature of the absorber. L is the total number of temperature data frames being sampled and summed. l is a variable of summation in equation 3 representing the lth temperature data frame or the variable which is being summed. The second summation is over all heat sinks in contact with the absorber. $\Gamma$ is the coefficient of absorption of the EM absorber, $\tau$ is the coefficient of transmission of the EM absorber, $T_l$ is the final temperature of the EM absorber of the lth frame, $T_{l-1}$ is the initial temperature of the EM absorber of the l-1 frame, c is the emissivity of the EM absorber, $\sigma_b$ is the Stefan-Boltzmann constant, C is the specific heat of the heat sink (coolant), V is the volume of the heat sink (coolant), $\rho$ is the density of the heat sink (coolant), A is the contact area between the absorber and the heat sink (coolant), $\Delta t$ is the time between the initial frame ($t_{l-1}$) to the final frame ($t_l$), D is the degrees of freedom of the atoms or molecules that comprise the EM absorber. In the pulsed power alternative embodiment, a modified step 10 would include a selection of additional said temperature image data frames in between said initial and final temperature image data frames and determines associated time differentials between consecutive said selected additional temperature image data frames. As described above, a modified step 11 further serially calculates power density between each two of each selected temperature image data frames then said processing continues by summing all of the power density data for each two consecutive temperature image data frame from the initial frame to the final frame to produce a final power density data. For pulsed power density calculations, when summing the power density of all power density computations, the final solution is calculated by dividing by the total number of paired frames minus one. For example, where six frames are used to compute power density for pulsed power, the sum of the power density values must be divided by five (i.e., 6 total frames–1).

Next, at step 12, an output would be generated showing an image of an EM field associated with the EM source based on power density calculated for every pixel in an initial or "cold" IR image capture frame and a final or "hot" IR image capture frame.

In this pulsed power alternate embodiment of a power density measurement method, it is possible to make a pulsed power density measurement using as few as two data points which show the temperature rise from initial temperature to final temperature instead of waiting for the temperature to reach equilibrium.

Figure 8:
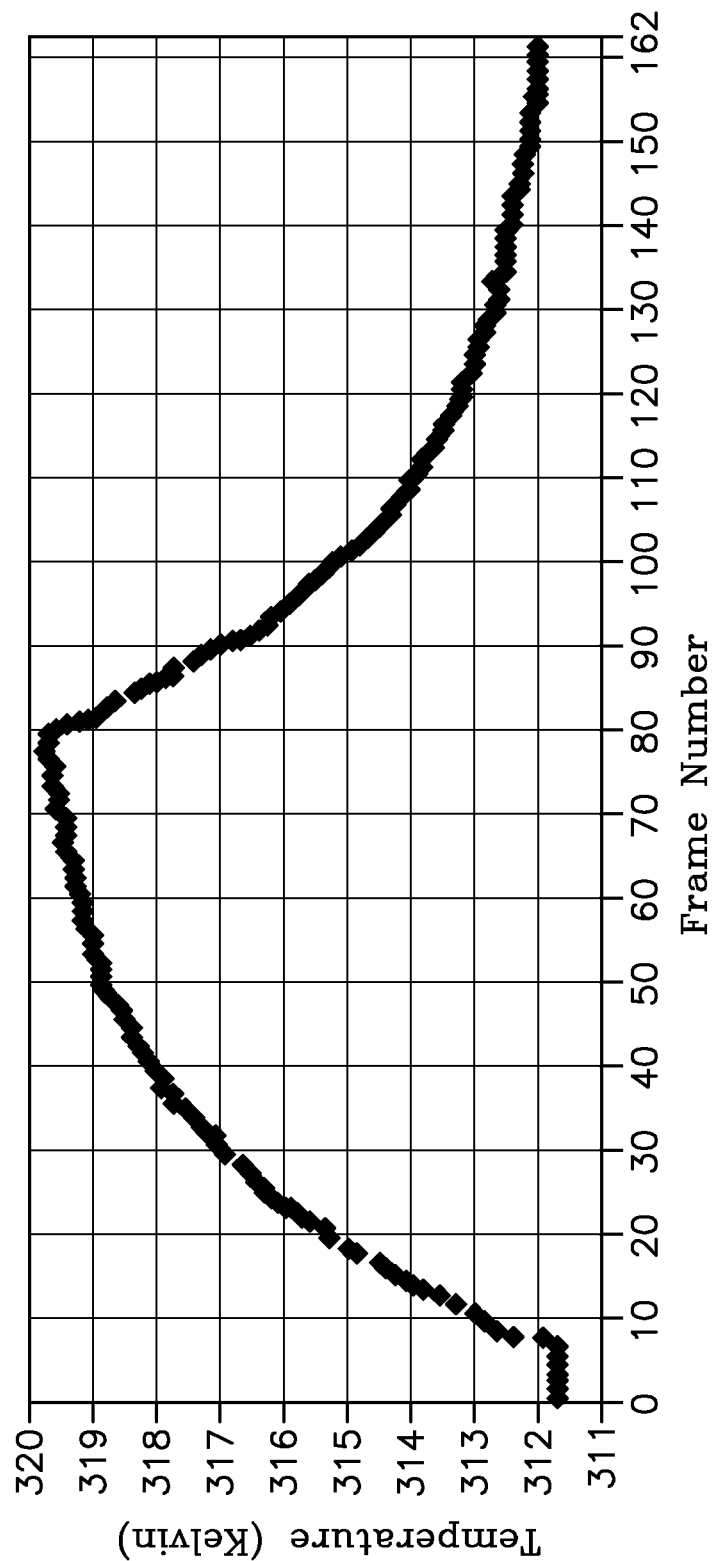
FIG. 8 shows an exemplary data plot of temperature data versus frame number of data collected from an EM source using one exemplary embodiment of the invention.

FIG. 8 shows an exemplary data plot of temperature data versus frame number of data collected from an EM source using one exemplary embodiment of the invention. A processing system in accordance with an embodiment of the invention sequentially analyzes each IR image capture frame starting a selected time e.g., t=0, then looks for the highest temperature reading associated with all the pixels in each frame, then plots the temperature value for each frame. Each data plot on this table shows a maximum temperature value for each separate IR image frame capture. The x-values in this table represent an individual IR image frame. In other words, each temperature data on the y-axis represents a pixel having the highest temperature in a frame capture comprising any number of pixels which were sampled during a given integration time per frame capture using an EM sensor, in this example an IR camera. The plot begins with a series of temperature data readings associated with a series of IR image capture frames before an EM source is energized and oriented on an EM absorber. After the EM source is energized, then a temperature data is plotted sequentially for each IR image capture frame on the x axis until the system reaches the end of the IR image capture frames.

An alternative embodiment of the invention can further include a mechanism adapted to move the EM source and/or the EM absorber relation to each other in order to manipulate either the EM field which is being measured or manipulate the EM absorber to move it through the EM field which is being measured. An additional set of components and software would be used to track the position of the EM field and/or the EM absorber and associate positional and time information with each movement of the EM absorber and/or EM source. These additional components, in addition to the components described above, would be used to collect sufficient data required to compute the power density and other characteristics associated which each plane of the EM field which the EM absorber was placed within. A series of software instructions for controlling the movement of the EM absorber and/or the EM source and then collecting separate data or measurements for each position of the EM source and/or EM absorber would be incorporated into the above embodiments of the invention. The output would then be a series of plane images of the EM field under test or a three dimensional image of the EM field under test which could include a three dimensional power density representation using the same or a different color scheme as described above. An output system could use a pointer system or a plane which could then be used to select specific cross sections of the three dimensional field.

Another embodiment could include manipulating the EM absorber and temperature sensor array around an area where the EM field is larger than the EM absorber. In this embodiment, the temperature sensor array and EM absorber would be positioned to take a number of sequential measurements which would be individually processed, then compiled into a mosaic to describe the overall area of interest where the EM field of interest is located.

Another embodiment can include changing the distance between the EM absorber and the EM source in order to take different measurements which would then be used to determine phase and amplitude characteristics of the EM source.

Another alternative embodiment can be used to characterize an EM absorber where the EM source and the temperature sensor array are calibrated and performance characteristics are known. This embodiment can be then be used to analyze physical characteristics of the EM absorber. An example could be determining a sample characteristics based on comparisons with known values such as specific heat capacity, density of material, atomic makeup of the material under test.

Another alternative embodiment of the invention could be used to characterize EM absorption of an atmosphere. The system would be oriented on an atmosphere where a star would be used as the EM source. An initial frame would be when the star is not oriented on atmosphere of the planet of interest (e.g., on its cold side), then take another series of frame captures when the star is oriented on the atmosphere of interest.

Benefits of the invention include being able to make parallel measurements versus serial or piece-meal measurements. Also, the invention permits high resolution measurements with significantly less effort, equipment, time and resources than currently required to produce desired outputs.

Although the invention has been described in detail with reference to certain preferred embodiments, variations and modifications exist within the spirit and scope of the invention as described and defined in the following claims.

The invention claimed is:

1. An electromagnetic field characterization apparatus comprising:
   an electromagnetic source adapted to emit electromagnetic field;
   an electromagnetic absorption material adapted to receive said electromagnetic field;
   a plurality of temperature sensors adapted to orient on said electromagnetic absorption material and output a plurality of temperature sensor data frames data;
   a plurality of processing sequences comprising:
      a first processing sequence adapted to select and store an initial and final temperature sensor data frame from said plurality of temperature sensor data frames based on a first and second temperature parameter, said first processing sequence further determines a differential temperature data associated with said initial and final temperature sensor data frames;
      a second processing sequence for calculating a power density data associated with all or a portion of said plurality of temperature sensors and said final temperature sensor data frame, said second processing sequence determines said power density data based on power density formula defined in equation (2) as $$\frac{1}{1-\tau-\Gamma}\left[D\varepsilon\sigma_b(T^4 - T_0^4) + \sum_{All\ Heat\ Sinks} \frac{C\rho V}{\Delta tA}(T - T_0)\right]$$

and a plurality of inputs to said equation (2) including said differential temperature data, where $\Gamma$ is a coefficient of absorption of the electromagnetic absorption material, $\tau$ is a coefficient of transmission of the electromagnetic absorption material, $T$ is the final temperature of the electromagnetic absorption material, $T_0$ is the initial temperature of the electromagnetic absorption material, $\varepsilon$ is emissivity of the electromagnetic absorption material, $\sigma_b$ is the Stefan-Boltzmann constant, $C$ is a specific heat of at least one heat sink, $V$ is a volume of the heat sink, $\rho$ is a density of the heat sink, $A$ is a contact area between the electromagnetic absorption material and the at least one heat sink, $\Delta t$ is a time differential between the initial and final temperature sensor data frames, and $D$ are degrees of freedom of atoms or molecules that comprise the electromagnetic absorption material, wherein said equation (2) is modified based on a particular said electromagnetic absorption material, wherein the modified equation (2) components are coefficient of absorption of the electromagnetic absorption material, said plurality of degrees of freedom data for atoms or molecules associated with said electromagnetic absorption material, emissivity of blackbody radiation associated with said electromagnetic absorption material, specific heat capacity of said at least one heat sink placed in proximity to said electromagnetic absorption material, density of said at least one heat sink, volume of said at least one heat sink, and area of interface between said at least one heat sink and said electromagnetic absorption material; and a third processing sequence for producing at least one graphical user interface, said at least one graphical user interface comprises a power density image output produced based on a plurality of ranges of power density values which depicts said power density data, said at least one graphical user interface also is adapted to display one or more said power density data associated with at least one of said plurality of temperature sensors.

2. An electromagnetic field characterization apparatus as in claim 1, further comprising a processing system adapted to process said plurality of processing sequences and produce a plurality of outputs comprising said power density image output.

3. An electromagnetic field characterization apparatus as in claim 1, further comprising providing a temperature control mechanism which provides cooling to said electromagnetic absorption material.

4. An electromagnetic field characterization apparatus as in claim 3, wherein said temperature control mechanism is a circulation fan.

5. An electromagnetic field characterization apparatus as in claim 1, wherein said electromagnetic source is a radio frequency source coupled to an electromagnetic field radiating structure.

6. An electromagnetic field characterization apparatus as in claim 1, wherein said plurality of temperature sensors comprises one or more infrared image sensing apparatus.

7. An electromagnetic field characterization apparatus as in claim 1, wherein said plurality of temperature sensors is a video camera adapted to record infrared or near infrared spectrum energy.

8. An electromagnetic field characterization apparatus as in claim 1, wherein said first temperature parameter is a lowest temperature data value and said second temperature parameter is a highest temperature value.

9. An electromagnetic field characterization apparatus as in claim 1, further comprising a mechanism adapted to move said electromagnetic source or the electromagnetic absorption material relation to each other in order to manipulate either said electromagnetic field which is being measured or manipulate the electromagnetic absorption material to move it through the electromagnetic field which is being measured.

10. An electromagnetic field characterization apparatus as in claim 1, wherein said first processing sequence further selects additional temperature sensor data frames in between said initial and final temperature sensor data frames and determines associated time differentials between consecutive said additional temperature sensor data frames, wherein said second processing sequence for calculating a power density data further serially calculates power density between each two selected temperature sensor data frames then said second processing sequence sums all of the power density data for each two consecutive temperature sensor data frame from said initial frame to said final frame to produce a final power density data.

11. A method of manufacturing an electromagnetic field characterization apparatus comprising:
providing an electromagnetic source adapted to emit electromagnetic field;
providing an electromagnetic absorption material adapted to receive said electromagnetic field;
providing a plurality of temperature sensors adapted to orient on said electromagnetic absorption material and output a plurality of temperature sensor data frames data;
providing a plurality of processing sequences comprising:
a first processing sequence adapted to select and store an initial and final temperature sensor data frame from said plurality of temperature sensor data frames based on a first and second temperature parameter, said first processing sequence further determines a differential temperature data associated with said initial and final temperature sensor data frames;
a second processing sequence for calculating a power density data associated with all or a portion of said plurality of temperature sensors and said final temperature sensor data frame, said second processing sequence determines said power density data based on power density formula defined in equation (2) as $$\frac{1}{1-\tau-\Gamma}\left[D\varepsilon\sigma_b(T^4-T_0^4)+\sum_{All\ Heat\ Sinks}\frac{C\rho V}{\Delta tA}(T-T_0)\right]$$

and a plurality of inputs to said equation (2) including said differential temperature data, where $\Gamma$ is a coefficient of absorption of the electromagnetic absorption material, $\tau$ is a coefficient of transmission of the electromagnetic absorption material, $T$ is the final temperature of the electromagnetic absorption material, $T_0$ is the initial temperature of the electromagnetic absorption material, $\varepsilon$ is emissivity of the electromagnetic absorption material, $\sigma_b$ is the Stefan-Boltzmann constant, $C$ is a specific heat of at least one heat sink, $V$ is a volume of the heat sink, $\rho$ is a density of the heat sink, $A$ is a contact area between the electromagnetic absorption material and the at least one heat sink, $\Delta t$ is a time differential between the initial and final temperature sensor data frames, and $D$ are degrees of freedom of atoms or molecules that comprise the electromagnetic absorption material, wherein said equation (2) is modified based on a particular said electromagnetic absorption material, wherein the modified equation (2) components are coefficient of absorption of the electromagnetic absorption material, a plurality of degrees of freedom data for atoms or molecules associated with said electromagnetic absorption material associated with a blackbody radiation calculation, emissivity of blackbody radiation associated with said electromagnetic absorption material, specific heat capacity of said at least one heat sink placed in proximity to said electromagnetic absorption material, density of said at least one heat sink, volume of said at least one heat sink, and area of interface between said at least one heat sink and said electromagnetic absorption material; and a third processing sequence for producing at least one graphical user interface, said at least one graphical user interface comprises a power density image output produced based on a plurality of ranges of power density which depicts said power density data, said at least one graphical user interface also is adapted to display one or more said power density data associated with at least one of said plurality of temperature sensors.

12. A method of manufacturing an electromagnetic field characterization apparatus as in claim 11, further comprising providing a processing system adapted to process said plurality of processing sequences and produce a plurality of outputs comprising said power density image output.

13. A method of manufacturing an electromagnetic field characterization apparatus as in claim 11, further comprising providing a temperature control mechanism which provides cooling to said electromagnetic absorption material.

14. A method of manufacturing an electromagnetic field characterization apparatus as in claim 13, wherein said temperature control mechanism is a circulation fan.

15. A method of manufacturing an electromagnetic field characterization apparatus as in claim 11, wherein said electromagnetic source is a radio frequency source coupled to an electromagnetic field radiating structure.

16. A method of manufacturing an electromagnetic field characterization apparatus as in claim 11, wherein said plurality of temperature sensors comprises one or more infrared image sensing apparatus.

17. A method of manufacturing an electromagnetic field characterization apparatus as in claim 11, wherein said first temperature parameter is a lowest temperature data value and said second temperature parameter is a highest temperature value.

18. A method of manufacturing an electromagnetic field characterization apparatus as in claim 11, further comprising a mechanism adapted to move said electromagnetic source or the electromagnetic absorption material relation to each other in order to manipulate either said electromagnetic field which is being measured or manipulate the electromagnetic absorption material to move it through the electromagnetic field which is being measured.

* * * * *